United States Patent Office 2,977,193
Patented Mar. 28, 1961

2,977,193

METHOD OF PRODUCING A DIELECTRIC MATERIAL

Harold S. Endicott, Schenectady, and George E. Ledges, Dryden, N.Y., assignors to General Electric Company, a corporation of New York No Drawing. Filed Oct. 1, 1957, Ser. No. 687,359

5 Claims. (Cl. 23—110)

Our invention relates to a method of producing a dielectric material and, more particularly, to a method of treating phlogopite mica to form an improved dielectric material with a high resistivity in an elevated temperature range of 300° C. and above.

Development of aircraft and missile propulsion systems, which must operate in high temperature environments, has created a problem of providing a dielectric material which will function in a temperature range of above 300° C. and, more specifically, at about 600° C. For example, capacitors must operate at 600° C. with 100 volts, D.-C., applied and with a resistivity of at least 0.01 megohm microfarads for prolonged time periods. Other applications require dielectric materials with higher resistivities or higher voltage at elevated temperatures.

Muscovite mica, which is sometimes called white mica, possesses good dielectric properties, particularly at temperatures below 300° C. Phlogopite mica, or amber mica, has not been employed generally as a dielectric material. Muscovite mica might be expected to exhibit a required resistivity of at least 0.01 megohm microfarads when subjected to a temperature of 600° C. However, it was found that resistivity decreased rapidly during temperature increases to provide a below minimum resistivity at 600° C. Furthermore, prolonged exposure of this mica at a temperature of 600° C. would result in its disintegration. Thus, muscovite mica is unsuitable for such high temperature applications.

Our present invention provides an improved method of producing a dielectric material which exhibits a resistivity of in excess of 0.01 megohm microfarads at 600° C.

It is an object of our invention to provide an improved method of producing a dielectric material for subsequent use at temperatures in the range of 300° C. and above.

It is another object of the invention to provide an improved method of producing a dielectric material with high resistivities at elevated temperatures.

It is a further object of the invention to provide an improved method of producing a dielectric material with a resistivity in excess of 0.01 megohm microfarads at a temperature of 600° C.

In carrying out our invention in one form, a sheet of phlogopite mica is subjected to a direct voltage while the mica is simultaneously heated at a temperature between 300° C. and 800° C. to produce a dielectric material with high resistivities at elevated temperatures.

These and various other objects, features and advantages of the invention will be better understood from the following description.

Single sheet capacitors were made which employed muscovite dielectrics and stainless steel electrodes. Subsequently, these capacitors were heated in an enclosed electric furnace at various elevated temperatures to determine if the dielectric material would retain a high resistivity. We have found that resistivity decreased rapidly with temperature increases to provide a resistivity below the desired minimum of at least 0.01 megohm microfarads at 600° C. Table I shows the results of heating one muscovite mica sheet at elevated temperatures. Thus, muscovite mica appeared unsuitable for use in high temperature application.

TABLE I

| Temperature | Capacitance (Picofarads) | Resistivity (Megohm Microfarads) |
|---|---|---|
| 400° C | 793 | 0.21 |
| 500° C | 820 | 0.014 |
| 600° C | 1,415 | 0.002 |

We discovered unexpectedly that a phlogopite mica sheet exhibited a resistivity of more than 0.01 megohm microfarads when it was heated to a temperature of 600° C. Single sheet capacitors, which each employed a phlogopite mica dielectric and stainless steel electrodes, were heated in an electric furnace to several elevated temperatures with results which are shown in Table II.

TABLE II

| Number | Temperature, °C. | Capacitance (Picofarads) | Resistivity (Megohm Microfarads) |
|---|---|---|---|
| 1 | 300 | 690 | 6.300 |
| 1 | 400 | 715 | 0.650 |
| 1 | 500 | 763 | 0.080 |
| 1 | 600 | 830 | 0.022 |
| 2 | 300 | 940 | 6.900 |
| 2 | 400 | 978 | 0.650 |
| 2 | 500 | 1,040 | 0.080 |
| 2 | 600 | 1,120 | 0.024 |
| 3 | 300 | 560 | 5.100 |
| 3 | 400 | 615 | 0.510 |
| 3 | 600 | 760 | 0.020 |

During the development of high temperature dielectric materials, we found, also unexpectedly, that subjecting a sheet of phlogopite mica to a direct voltage while the mica is simultaneously heated at temperatures between 300° C. and 800° C. produced an improved dielectric material with high resistivities at subsequent elevated temperatures. The exhibited resistivity of this mica at 600° C. was in excess of 0.01 megohm microfarads which is necessary for dielectric material in high temperature aircraft and missile propulsion systems. The discovery of this method of producing a dielectric material for high temperature use and the resulting product were totally unexpected since phlogopite mica is not considered generally as even a good low temperature dielectric material.

We prefer to apply a direct voltage of 200 volts per mil to 1000 volts per mil to phlogopite mica which voltage is limited only by the electric strength of the material. While a temperature range between room temperature and 950° C. can be employed in our method, higher temperatures in the range of 300° C. to 800° C. reduce the time period to produce a dielectric material which exhibits a resistivity in excess of 0.01 megohm microfarads when it is subjected subsequently to a temperature of 600° C. Furthermore, increasing the applied voltage and the temperature provides a time reduction in forming the mica product. The temperature range of 300° C. to 800° C. is preferred further since the phlogopite mica sheet can be heated initially at the elevated temperature at which the material is used subsequently. A direct measurement is possible of the resistivity of the mica product. We prefer further to apply a direct voltage of 215 volts per mil to a sheet of phlogopite mica while the mica is heated simultaneously at temperature of approximately 600° C. for ninety-eight hours to cause the mica to exhibit a resistivity in excess of 0.01 megohm microfarads at 600° C.

A preferred example of the method of producing a dielectric material with high resistivities at elevated temperatures in accordance with the present invention is as follows:

*Example I*

A sheet of phlogopite mica with a thickness of one mil was split from a book of mica. After silver paint electrodes were fired on the material, the electrodes were connected to a direct current power source. The mica sheet was then placed in an enclosed electric furnace. After the mica was heated to 600° C., its resistivity was measured at an initial value of 0.010 megohm microfarads. A direct voltage of 215 volts per mil was applied to the mica sheet through its electrodes. Both the temperature of 600° C. and the voltage of 215 volts per mil were continued for ninety-eight hours. After this period, the elevated temperature and voltage were discontinued and the mica was allowed to cool to room temperature. This phlogopite mica sheet exhibited a resistivity of 0.170 megohm microfarads when it was subsequently heated to 600° C.

Another example of the method of producing a dielectric material with high resistivities at elevated temperatures in accordance with the present invention is as follows:

*Example II*

A one mil thick phlogopite sheet was prepared and treated in accordance with the procedure which is set forth in Example I. This sheet was similarly heated at 600° C. for ninety-eight hours while a direct voltage of 215 volts per mil was applied to the mica. The initial resistivity of the material was 0.012 megohm microfarads at 600° C., while the resulting mica product exhibited a resistivity of 0.15 megohm microfarads when it was heated subsequently at 600° C.

While other modifications of this invention and variations of the method which may be employed within the scope of the invention have not been described, the invention is intended to include all such as may be employed within the following claims.

What we claim as new and desire to secure by Letters Patent of the United States is:

1. A method of treating phlogopite mica for use as a dielectric material which comprises heating said mica to a temperature between room temperature and 950° C., and applying simultaneously to said mica a direct voltage of between 200 volts per mil and 1000 volts per mil for a time sufficient to increase the electrical resistance of said mica to a value greater than the resistance of untreated mica upon subsequent heating thereof to 600° C.

2. A method of treating phlogopite mica for use as a dielectric material which comprises heating said mica to a temperature between 300° C. and 800° C., and applying simultaneously to said mica a direct voltage of between 200 volts per mil and 1000 volts per mil for a time sufficient to increase the electrical resistance of said mica to a value greater than the resistance of untreated mica upon subsequent heating thereof to 600° C.

3. A method of treating phlogopite mica for use as a dielectric material which comprises heating said mica to a temperature of approximately 600° C., and applying simultaneously to said mica a direct voltage of between 200 volts per mil and 1000 volts per mil for a time sufficient to increase the electrical resistance of said mica to a value greater than the resistance of untreated mica upon subsequent heating thereof to 600° C.

4. A method of treating phlogopite mica for use as a dielectric material which comprises heating said mica to a temperature between 300° C. and 800° C. and applying simultaneously to said mica a direct voltage of approximately 215 volts per mil for a time sufficient to increase the electrical resistance of said mica to a value greater than the resistance of untreated mica upon subsequent heating thereof to 600° C.

5. A method of treating phlogopite mica for use as a dielectric material which comprises heating said mica to a temperature of approximately 600° C., and applying simultaneously to said mica a direct voltage of approximately 215 volts per mil for a time sufficient to increase the electrical resistance of said mica to a value greater than the resistance of untreated mica upon subsequent heating thereof to 600° C.

References Cited in the file of this patent

UNITED STATES PATENTS

| | | |
|---|---|---|
| 2,108,577 | Brough | Feb. 15, 1938 |
| 2,614,055 | Senarclens | Oct. 14, 1952 |
| 2,745,048 | Schick | May 8, 1956 |